Sept. 20, 1955     G. L. PERRY ET AL     2,718,088
BAIT CAGE
Filed Jan. 21, 1953
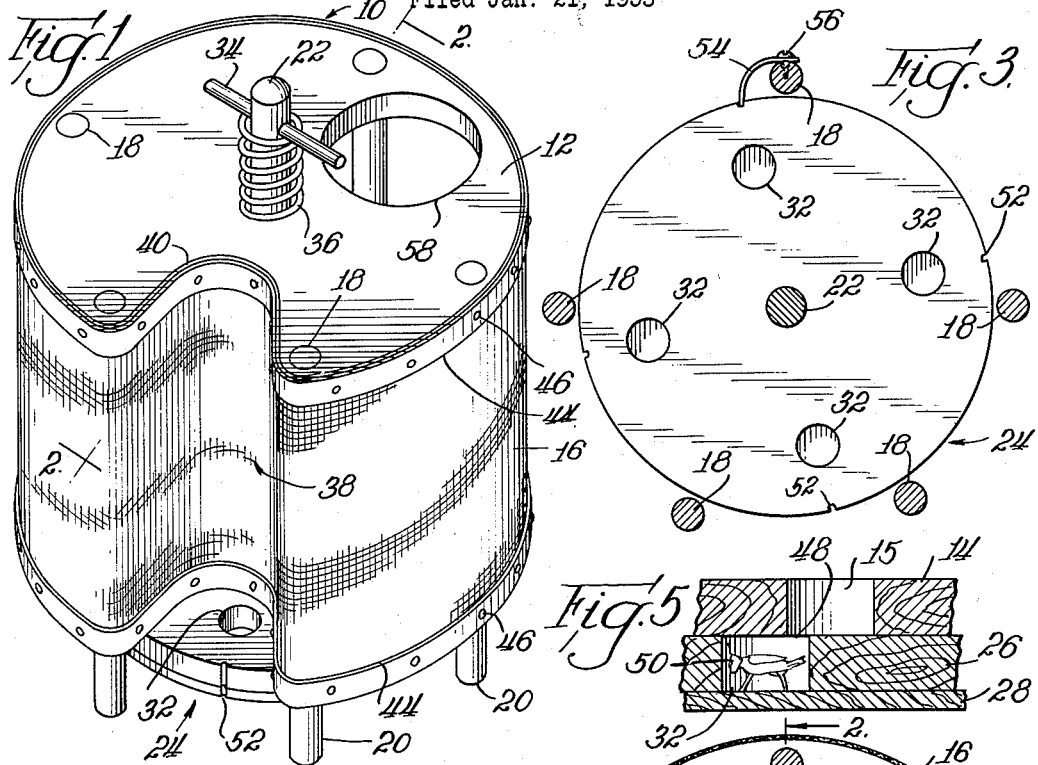
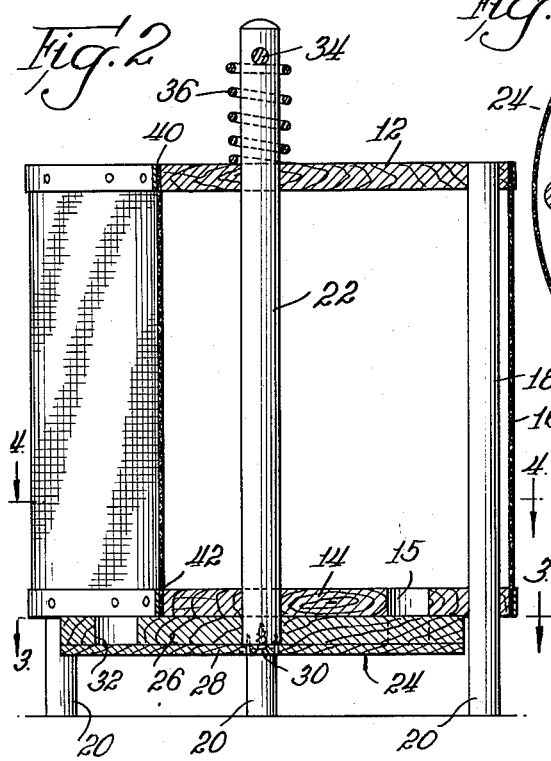
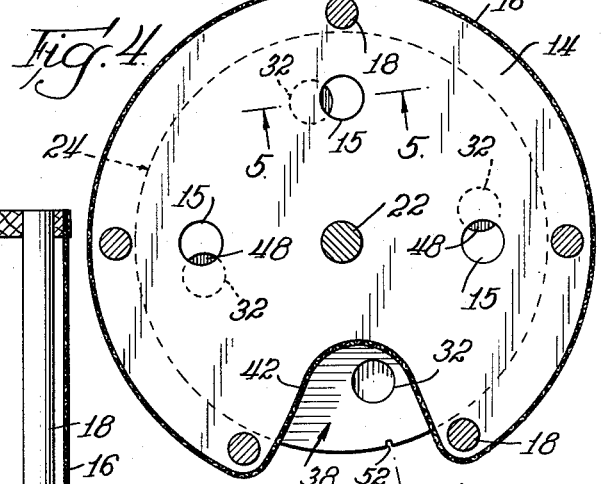
INVENTORS:
Guy L. Perry and
James M. Kehr
By:- Brown, Jackson,
Boettcher & Dienner    Attys.

United States Patent Office 2,718,088
Patented Sept. 20, 1955

2,718,088

BAIT CAGE

Guy L. Perry and James M. Kehr, Elkhart, Ind.

Application January 21, 1953, Serial No. 332,144

3 Claims. (Cl. 43—55)

The present invention relates to a cricket cage, and more specifically, a cricket cage of the type which may be used by fishermen for keeping bait alive and readily available for use when needed.

Live bait boxes and cages for fishermen are widely used for the purpose of keeping on hand the different types of live fish bait so that a fisherman may take in a supply of the desired type of live bait ahead of the time when he intends to use same. The various types of such live bait boxes or cages are well known to fishermen and they usually are adapted to maintain as far as possible the life sustaining conditions of the bait desired to be kept on hand. Thus, for minnows and other bait normally living in an aqueous environment a suitable metallic or plastic cage with perforated sides immersed in water will ordinarily be used to confine a number of such live bait until the fisherman needs them. The various types of non-aqueous live bait are normally maintained in wire, cardboard, wooden or other types of cages. One of the big problems of fishermen who keep live bait in cages is the difficulty of securing a bait from inside the cage; it is a well known fact that the bait inside the cage will make every effort to elude the hand of the fisherman until it is either exhausted or badly injured. The chasing of live bait around the cage is not only highly irritating to the fisherman but wastes time and often results in securing a bait which is so badly injured that it must be discarded.

It is an object of this invention to provide a bait cage which not only satisfactorily maintains non-aqueous live bait in a confined condition, but provides a means whereby such type of live bait may be easily and safely secured from inside the cages without irritation to the fisherman or damage to the bait.

We have noted, in applying our invention to the common type of cricket, that it is the cricket's nature to hide in dark recesses under logs or rocks in the daytime, and when once discovered will attempt to again hide in such dark recesses; also, when a number of crickets are caged together in a screened container they will seek out holes and the like in the floor of the container to hide themselves in the dark recesses provided therein.

Therefore, it is a further object of our invention to provide a cricket cage which is peculiarly adapted to utilize the tendency of the cricket to hide as a means for aiding the fisherman in securing a live bait from inside the cricket cage without damage to the cricket or irritation to the fisherman.

It is commonly known that many of the types of non-aqueous bait used for fishing are attracted by an illuminated object at night and we have noted that such bait may be attracted from a darkened container into an illuminated container by a ray of light passing through a passageway connecting the containers.

It is therefore a further object of our invention to provide a bait cage which is peculiarly adapted to utilize the tendency of some types of bait to be attracted by light as a means for aiding the fisherman in securing a live bait from inside the bait cage without damage to the bait or irritation to the fisherman.

Other objects and advantages of the present invention will become apparent in the following description of a preferred embodiment of the cricket cage of the present invention and the preferred used thereof.

Now, in order to acquaint those skilled in the art with the cricket cage of the present invention, we shall describe, in connection with the accompanying drawings, a preferred embodiment of our cricket cage.

In the drawings:

Figure 1 is a perspective view of a preferred embodiment of our invention;

Figure 2 is a cross sectional view, partly in elevation, along the line 2—2 of Figures 1 and 4;

Figure 3 is a cross sectional view along the line 3—3 of Figure 2;

Figure 4 is a cross sectional view along line 4—4 of Figure 2;

Figure 5 is a cross sectional view along line 5—5 of Figure 4; and

Figure 6 is a cross sectional view similar to Figure 5 but showing a modification of our invention.

Referring now to the drawings in which like numerals are employed to designate like parts throughout the several views, reference numeral 10 generally designates the cricket cage which constitutes the preferred embodiment of our invention. The cricket cage 10 has a wooden upper head 12 forming the ceiling of the cage and a wooden lower head 14 forming the floor, the space between the heads 12 and 14 being enclosed by a wire screen 16 which thus forms the walls of cage 10. Heads 12 and 14 are secured in fixed relationship with respect to each other by rods 18, which are fixed at their opposite ends adjacent the outer periphery of head member; the number of rods 18 used may be varied to suit varying requirements, but in our preferred embodiments we have five of such rods 18 spaced in the manner shown in Figure 4 for a purpose hereinafter made clear. The lower ends of rods 18 preferably extend through the lower head 14 and form supporting feet 20. Lower head 14 has three holes 15 formed therein, the three holes 15 being preferably ninety degrees apart and spaced an equal distance from the center of the lower head. Rotatably mounted at the axial center of each head is a rod or spindle 22, which also passes below the lower head 14; the lowermost end of rod or spindle 22 has fixed thereto a carrier or plate generally indicated at 24, which is made of two circular wooden discs 26 and 28. These discs 26 and 28 are glued or otherwise fastened together and fixed on the rotatable spindle 22 by means of a suitable screw 30. Formed in the thicker disc 26 are four holes which are spaced ninety degrees apart and are the same distance from the center of the disc 26 that the holes 15 are from the center of lower head 14. When the disc 28 has been fixed to disc 26 these four holes become recesses or pockets 32, as shown most clearly in Figure 5. It is obvious, of course, that carrier 24 may be made from a single disc, if so desired. The upper end of the rotatable spindle or rod 22 carries a wooden rod or handle member 34 by means of which the rotatable spindle or rod 22 may be turned; cooperating between the handle member 34 and the upper head member 12 is a coil spring 36 which urges the rotatable spindle or rod upwardly, thus providing a frictional contact between the upper surface of the carrier 24 and the lower surface of the lower head 14.

As aforesaid, a wire screen 16 or the like encloses the space between the heads 12 and 14 and a niche or reentrant angle 38 is made in the cylindrical wall of the cricket cage 10 by making a fold in the screen between two of the posts 18. As shown in Figure 4, two of the posts 18 are spaced relatively close together at that portion of lower head 14 which does not have a hole 15 therein; grooves or reentrant angles 40 and 42 are cut in the upper and lower heads, respectively, of sufficient size to define in cooperation with screen 16 a niche or reentrant angle 38 which will uncover recesses 32, one at a time, as the carrier 24 is rotated. The screen 16 is then fitted about the head members 12 and 14 and is held in place by sheet metal strips 44 secured to the upper and lower heads through tacks 46.

In adapting our cricket cage 10 to take fullest advantage of a cricket's aforementioned tendency to hide himself when exposed to light, we have found that it is best to provide a recess which is at least partially darkened. In our preferred embodiment, we prefer to space the holes 15 and recesses 32 in a matching relationship, but sufficiently out of register to form a small passageway 48 therebetween. Such positioning tends to shut out most of the light which would otherwise pass into recess 32 if holes 15 and recesses 32 exactly registered and the side of the recesses 32 opposite from the passageway 48 will be cast in deep shadow. Therefore, this recess constitutes the darkened portion of our cage while the space between the two head members 12 and 14 constitutes the illuminated portion of our cage and when holes 15 and recesses 32 are properly aligned a cricket trap is provided. When the cricket 50 contained within the illuminated portion of our cage discovers the hole 15 with passageway 48 leading down into the darkened recess 32, he will try to hide himself in the recess. When the fisherman desires to remove one of the crickets from the cage to bait his hook, he merely grasps the handle 34 with one hand and puts his other hand into the niche 38, rotates the carrier with the first hand until a recess 32 is exposed in niche 38 and then grasps the exposed cricket with his said other hand. If the cricket should escape the hand of the operator it is still restrained from complete escape as it is back in the niche or corner where it is more easily caught than it would be if it got out into the open. Thus, the irritating procedure of chasing the bait around the inside of the cage is done away with and the fisherman is able to deliver a bait into his hand without material damage to the bait.

We have found it desirable to provide a means to set the holes 15 and the recesses 32 in the preferred relationship with a minimum of adjustment and we therefore provide an indexing means in which notches 52 cooperate with the spring pawl 54 attached to one of the legs 20 (see Figure 3), the spring pawl 54 being secured in place by a suitable screw 56. After the carrier 24 has been rotated to expose a cricket, further rotation will move the next notch 52 so that the spring pawl 54 will drop into the notch 52 to hold the carrier exactly in the best position to induce crickets to crawl into empty recesses.

Crickets may be conveniently inserted into the cage through hole 58 provided in the upper head 12; a suitable cover (not shown) for hole 58 may be provided to keep the crickets from jumping out of the cage. The wire screen 16 for restraining the movement of crickets placed inside the cage may be of any well known size just so that the spaces between the wires are small enough to prevent the smallest cricket held in the cage from crawling out through the wire and the spaces are large enough to admit sufficient light so that the space between the two head members 12 and 14 is not cast in a deep shadow. It is obvious of course, that the elements specified in our preferred embodiment as wooden might just as well be formed from plastic or metallic substances if so desired.

We have found that in actual practice it is well to make the holes 15 and the recesses 32 of such a size that when the carrier 24 is spaced with respect to the lower head member 14 as shown in Figures 4 and 5, the passageway 48 is large enough to accommodate a moderately sized cricket. When such is the case only one cricket at a time can fit into the recess 32 so that there is no chance of two crickets being delivered to the fisherman when he wants only one; moreover, there is little chance of a cricket being crushed between the carrier 24 and the lower head member 14 since there would be insufficient room for a second cricket to insert itself even part way into passage 48. It is obvious, of course, that the sizes of the holes 15 and the recesses 32 can be varied to meet the requirements of the occasion; however, the moderate sized cricket is the kind most generally used by fishermen.

Figure 6 illustrates a modification of our invention which takes advantage of the propensity of certain types of bait, such as the grasshopper, when held or contained in a darkened enclosure, to be attracted to a beam or ray of light. In this modification a covering of an opaque substance, as for instance a sheet of metal or plastic shaped to the desired configuration, encloses the space between the two head members 12 and 14. A transparent or translucent plate 60 of glass or the like forming the recesses 32 is substituted for the disc 28 in the carrier 25. The remainder of the elements aforedescribed are substantially the same although it is pointed out that the cover (not shown) for hole 58 should be of a kind which effectively prevents penetration of light rays. There is thus provided a darkened portion in which the bait is normaly retained until needed and an illuminated movable recess which comprises the bait trap used to obtain a bait from inside the bait cage. When the holes 15 and the recesses 32 are positioned to form the small passageway 48 in the aforementioned manner, beams or rays of light will pass from the illuminated recesses 32 through the passageways 48 into the darkened bait containing portion of our cage. Bait which is attracted by light will tend to crawl through passageway 48 into the illuminated recesses 32 and movement of the carrier 25 will trap the bait; further movement of the carrier will expose a recess 32 containing a bait at the niche or reentrant angle 38 where the fisherman may effectively grasp the bait.

The foregoing description and the drawings are given merely to explain and illustrate my invention, and the manner in which it may me used, and the invention is not to be limited thereto, except in so far as the appended claims are so limited since those skilled in the art who have our disclosure before them will be able to make modifications and variations therein without departing from the scope of the invention.

We claim:

1. A cage for retaining a plurality of live bugs and the like and for dispensing the bugs one by one for use by fishermen, comprising an upper head member, a lower head member, means securing said upper head member and said lower head member in fixed relationship, bug movement restraining means secured about the space between said head members, a rod pivotally mounted in said head members, and a carrier fixed to said rod below said lower head member, said lower head member having openings therein, said carrier having recesses therein, said bug movement restraining means and said lower head member having a fisherman's hand receiving niche therein, said niche exposing a portion of said carrier to expose one of said recesses, said carrier being movable by said rod to establish communication between at least one of said openings and one of said recesses to induce a bug contained in said cage to crawl through the opening into the recess, and said rod and carrier being rotatable to expose said one recess in said niche so that a fisherman may grasp the bug.

2. A fisherman's bait cage for retaining a plurality of live bait of like kind and for dispensing the bait one at a time, comprising an upper head member, a lower head member, means securing said upper head member and said lower head member in fixed relationship, bait movement restraining means secured about the space between said head members, a rod pivotally mounted in said head members, and a carrier fixed to said rod below said lower head member, said lower head member having openings therein and said carrier having recesses therein, said bait movement restraining means and said lower head member having a fisherman's hand receiving niche therein, said niche exposing a portion of said carrier to expose a single one of the recesses therein, said cage comprising an unnatural habitat for the bait, said recesses in said carrier simulating a natural habitat for the bait, said carrier being movable to establish communication between at least one of said openings and at least one of said recesses, a bait being induced by the natural habitat simulated to work its way through the opening and into the recess, and said rod being rotatable to rotate said carrier to expose said one recess in said niche so that a fisherman may grasp the bait.

3. In a device of the class described, a cage for retaining bait, said cage having a side wall, a floor having a hole therein, and a ceiling, said side wall and said floor having a reentrant angle, a movable carrier mounted below the floor for dipsensing bait one at a time, said carrier having a bait receiving pocket opening upwardly, and means for moving the carrier relative to the floor to bring said pocket into communication with said hole and for moving said carrier to close said hole and to bring said pocket into register with said reentrant angle of said wall to expose said pocket exteriorly of said cage, said cage comprising an unnatural habitat for the bait, said pocket in said carrier simulating a natural habitat for the bait, and the bait thus being induced to enter said pocket when said pocket and said hole communicate, whereupon the bait may be dispensed by moving said carrier to expose said pocket to the exterior of said cage.

References Cited in the file of this patent

UNITED STATES PATENTS

| | | |
|---|---|---|
| 600,314 | Howard | Mar. 8, 1898 |
| 1,535,424 | Launderville | Apr. 28, 1925 |
| 2,117,685 | Smith | May 17, 1938 |
| 2,579,549 | Cave | Dec. 25, 1951 |
| 2,580,096 | Holt | Dec. 25, 1951 |

FOREIGN PATENTS

| | | |
|---|---|---|
| 929,153 | France | June 30, 1947 |